United States Patent [19]

Säpper

[11] 3,969,643
[45] July 13, 1976

[54] GAS-COOLED DYNAMO-ELECTRIC MACHINE

[75] Inventor: Jorg Säpper, Windisch, Switzerland

[73] Assignee: BBC Brown Boveri & Company Limited, Baden, Switzerland

[22] Filed: Feb. 19, 1975

[21] Appl. No.: 551,117

[30] Foreign Application Priority Data

Mar. 4, 1974  Switzerland............... 2996/74

[52] U.S. Cl. ........................ 310/53; 310/58
[51] Int. Cl.² ........................................ H02K 9/00
[58] Field of Search ............ 310/52, 54, 53, 55, 310/56, 58, 59, 60, 60 A, 61, 64, 65, 158, 45, 211, 212, 197, 162, 163

[56] References Cited
UNITED STATES PATENTS

| | | | |
|---|---|---|---|
| 2,707,242 | 4/1955 | Baudry | 310/55 |
| 2,873,393 | 2/1959 | Baudry | 310/55 |
| 3,030,530 | 4/1962 | Tudge | 310/64 |
| 3,064,152 | 11/1962 | De Paul | 310/60 |
| 3,160,770 | 12/1964 | Asantcheeff | 310/157 |
| 3,517,232 | 6/1970 | Sano | 310/59 |
| 3,716,732 | 2/1973 | Tillma | 310/61 |
| 3,739,208 | 6/1973 | Shartrand | 310/58 |

*Primary Examiner*—R. Skudy
*Attorney, Agent, or Firm*—Pierce, Scheffler & Parker

[57] ABSTRACT

A dynamo-electric machine of the gas-cooled type, for example, an induction of synchronous machine is comprised of a casing which houses a rotor and a stator. A gas-coolant inlet space is provided within the casing at each end thereof and a gas-coolant outlet space is provided between the periphery of the stator and the inner surface of the casing. The internal space occupied by the stator and rotor components is separated from the gas-coolant inlet spaces provided within opposite end portions of the casing and the gas-coolant is force-circulated from the inlet spaces in a radially outward direction through radially extending slots provided in the rotor and stator to the outlet space, the rotor slots functioning as a centrifugal fan in establishing the forced circulation of the gas-coolant through the machine. In addition to the cooling slots in the stator, the gas-coolant passes through a channel provided along each end face of the stator, and these channels are established by annular divider members located in axially spaced relation to the stator end faces and which also function as substantially gas-tight partitions between the channels and the gas-coolant inlet spaces. Also, the end turn portions of the stator winding are located substantially completely within the gas-coolant inlet spaces.

7 Claims, 4 Drawing Figures

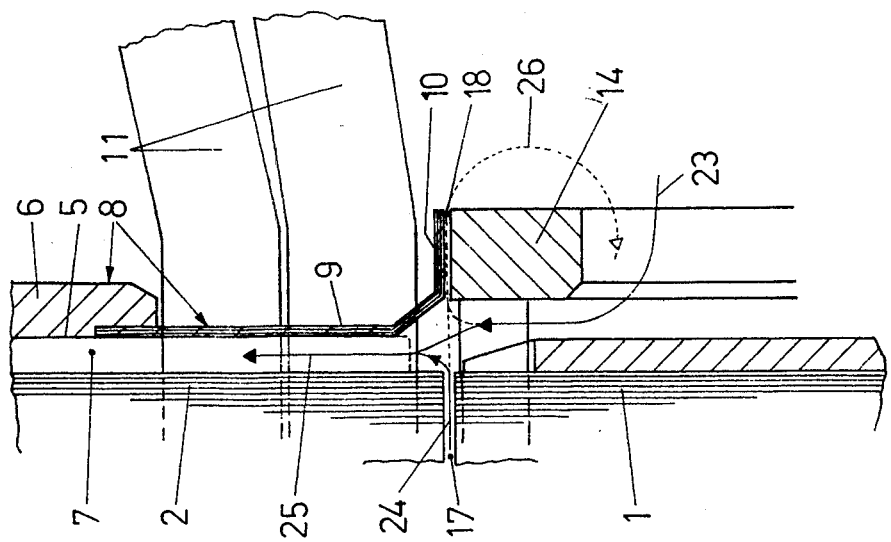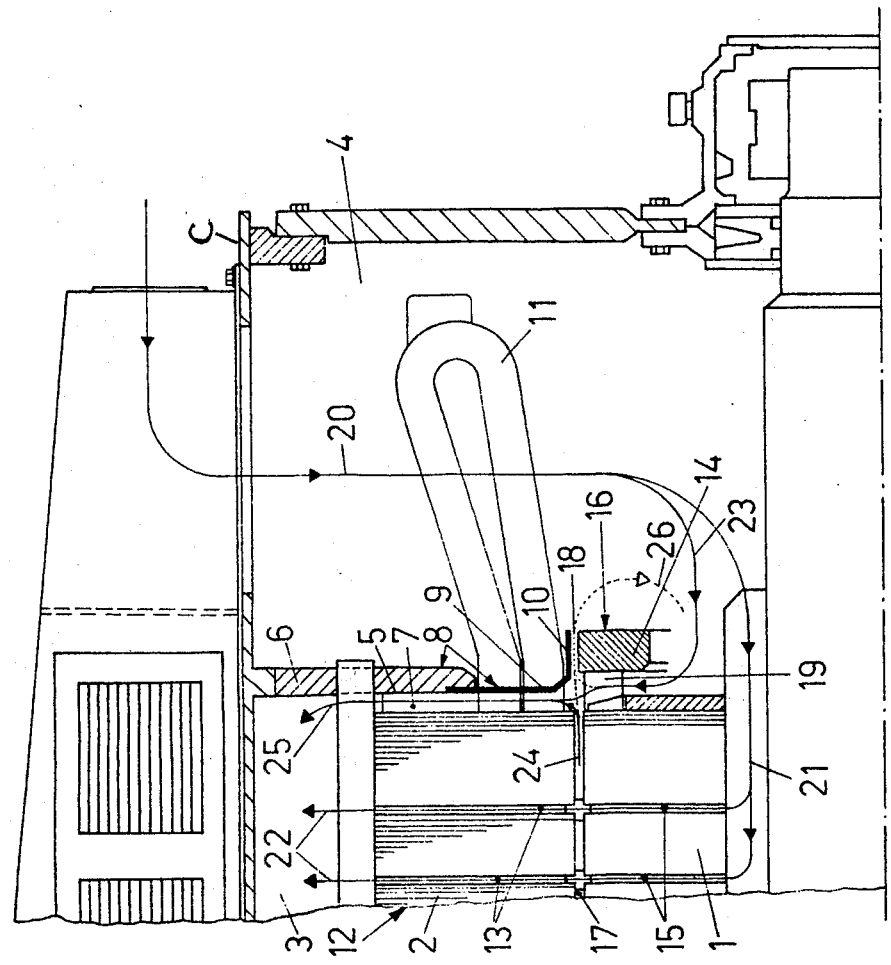

GAS-COOLED DYNAMO-ELECTRIC MACHINE

The present invention relates to a dynamo-electric machine of the gas-cooled type, the machine comprising a casing, a rotor mounted for rotation within the casing, a laminated stator surrounding the rotor, a gas-coolant inlet space provided within the casing at each end thereof, and a gas-coolant outlet space provided between the periphery of the stator and the inner surface of the casing. The internal space occupied by the stator and rotor components is separated from the gas-coolant inlet spaces provided at the opposite ends of the casing and the gas-coolant is force-circulated from the inlet spaces in a radially outward direction through the body of the rotor and stator component to the gas-coolant outlet space surrounding the stator.

Gas-cooled electrical machines of this general type have been customary engineering practice for some time. In the case of a known induction type machine presented in an article by R. H. Barber and T. A. Rohling in the Allis-Chalmers Engineering Review (No. 1, volume 38, 1973), on the subject of "Large Vertical Induction Motors Redesigned," the internal space occupied by the stator and the rotor, is separated from an axially outer flow inlet space for the cooling gas by means of a dividing device in such a manner that end turns of the stator winding are located entirely within the internal space. Cooling gas flows radially into the flow inlet space in an inward direction. Owing to the centrifugal-fan effect of cooling slots provided within the rotor, a first part of this cooling gas flows through these slots and cooling slots in the body of the laminated stator into the flow outlet space. A second part of the cooling gas is deflected by the extended rotor bars, which act as a centrifugal fan, and blown radially outwards over the stator end-winding and through holes in the pressure plate into the flow outlet space. This gas thus cools the stator end-winding and the end face of the laminations. The cross-sectional dimensions of the flow inlet space and of the end-winding space enclosing the stator end-winding are relatively large, and the cooling-gas velocity in these spaces is correspondingly low. Heated up cooling gas from the air gap between the rotor and the stator can already flow into the end-winding space as leakage gas, mix with the fresh cooling gas and heat this before it has absorbed the heat of the stator end-winding and of the end face of the laminations. The end-winding is thus cooled at a low gas velocity by cooling gas that has been mixed with hot gas. The end face of the laminated stator is similarly cooled by the same heated cooling gas at low velocity. This cooling is unselective and is of only limited effect, because high velocities are necessary to remove large quantities of heat by convection. The need to give a special shape to a number of rotor bars, which in the case mentioned are extended in length, so that they act as additional generators of pressure, also points to a flow of cooling gas which would otherwise be inadequate. It is obvious that ineffective cooling can also unnecessarily restrict the electrical output of the machine.

In the case of a synchronous machine described in Swiss Pat. No. 463 612, the internal space occupied by the stator and rotor is also separated by means of a dividing device from an axially outer flow inlet space for the cooling gas. This machine incorporates a partition of insulating material and an axial fan mounted on the rotor. The outer portion of the stator end-winding extends into the flow inlet space, whereas, its inner portion is located in internal space occupied by the stator and rotor. The axial fan draws the cooling gas in the flow inlet space axially inwards over the outer portion of the stator end-winding and conveys it into the internal space occupied by stator and rotor. A first part of this cooling gas flows axially along the pole gaps between the poles, and radially outwards through the stator cooling slots into the flow outlet space. A second part of the cooling gas is diverted by the axial fan and blown radially outwards over the inner portion of the stator end-winding into the flow outlet space. This cooling gas thus cools the inner portion of the stator end-winding and the end face of the laminated stator, also at a low cooling-gas velocity. All the other disadvantages referred to above are also incurred here. Moreover, the need to use an axial fan to provide additional pressure again indicates a flow of cooling gas which otherwise would be insufficient.

The object of the present invention is to avoid the disadvantages of hitherto known techniques and to create an electrical machine of the kind stated above, whereby the division i.e. separation between the flow inlet space and the internal space occupied by stator and rotor is provided in the immediate vicinity of the ends of the stator and rotor in such a way that the stator end-winding is cooled with fresh, unmixed gas, and the end face of the stator is cooled selectively at high velocity and high efficiency, without the need for a fan as an additional pressure generator.

This object is achieved in that a channel for selectively cooling the end face of the stator and connecting with the flow outlet space is provided between the end face of the stator and the dividing device, in that the dividing device forms an approximately gastight partition between such channel and the flow inlet space, and the stator end-winding is located essentially outside the dividing device.

Examples of the invention will now be explained with reference to the drawings, in which:

FIG. 1 shows a section through a version of an induction machine in accordance with the invention;

FIG. 2 shows a detail of FIG. 1 on a larger scale, clearly depicting the gas flow channel and the dividing device;

Figure 4:
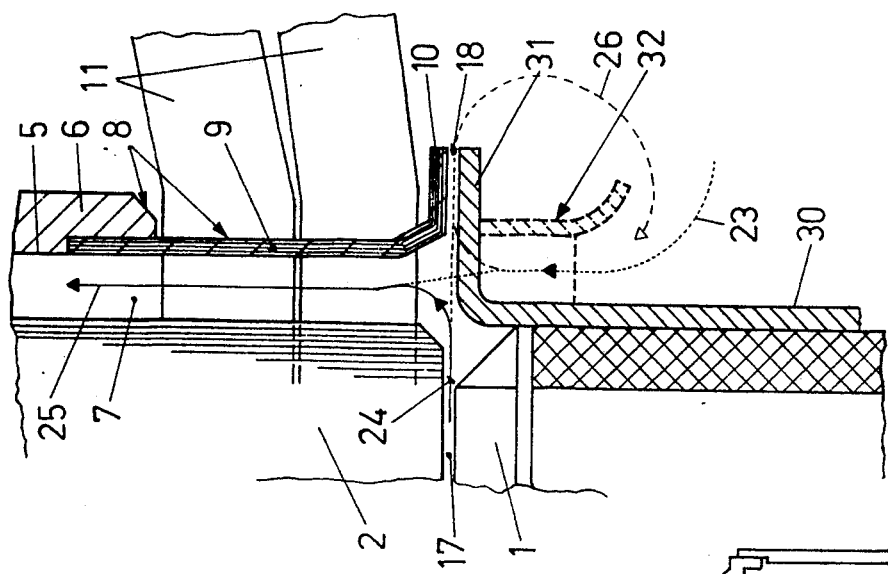
FIG. 4 shows a detail of FIG. 3 on a larger scale, clearly depicting the gas flow channel and the dividing device.

The induction type machine in FIGS. 1 and 2 includes a casing C providing an internal space 12, which contains the rotor 1 and its surrounding stator 2, the flow outlet space 3 adjacent the periphery of the stator, a flow inlet space 4 at each end and the stator pressure plate 6, which is mounted on the end face 5 of the stator 2. The dividing device 8 comprises the stator pressure plate 6, a radially extending disc-shaped portion 9 and an axially extending cylindrical portion 10. The dividing device 8 forms a virtually gas-tight partition between the stator-rotor space 12 and the flow inlet space 4 at each end of the casing. The pressure plate 6 and portion 9 comprise the vertical division between spaces 12 and 4, whereas, the cylindrical portion 10 surrounds the short-circuit ring 14 and with this forms an annular throttle-type seal 18 in order to provide a virtually gas-tight division between spaces 12 and 4. The channel 7 for cooling the end face 5 of the stator 2 is formed at the same time, this channel being connected to the flow outlet space 3 and serving as a flow path for the partial flow 25. The total volume of cooling gas 20 flows radially inwards through the flow inlet space 4 at each end of the casing. A first partial flow 21 of this gas flows radially outward through the radial rotor cooling slots 15, owing to the centrifugal-fan effect of the latter, then radially outward through the stator cooling slots 13 into the flow outlet space 3 to form a second partial flow 22. Owing to the centrifugal-fan effect of the rotating rotor end-winding 16, the third partial flow 23 flows radially outwards in channel 7. In so doing, it mixes with the already heated leakage flow 24 emerging from the air gap 17 between the rotor 1 and the stator 2, and together with this is conveyed along the channel 7 into the flow outlet space 3 as a fifth partial flow 25. The axial width of the channel 7 is very small in relation to the axial width of the flow inlet space 4, and therefore high cooling-gas velocities are obtained in channel 7 and the end face of the stator 2 is well cooled by convection, even though the already heated leakage flow 24 is also passed through channel 7. On the other hand, the cooling-gas stream 20, in a cool, unmixed state, cools the stator end-winding 11, all of which is located essentially axially outside the dividing device 8 in the gas inlet space 4.

The annular throttle-type seal 18 formed between the cylindrical portion 10 of the dividing device 8 and the periphery of short-circuit end ring 14 prevents the leakage flow 24 from escaping into space 4, and thus no turbulant flow 26 can occur and the leakage gas 24 cannot mix with the cooling gas intended for cooling the stator end-winding 11. The only means of generating pressure are the rotor cooling slots 15, which act as a centrifugal fan, and the rotating rotor bars 19, which also act as a centrifugal fan. Thus, no additional pressure generator is required. The machine cools itself without assistance. The cooling effect is satisfactory in every respect.

The induction machine shown in FIGS. 1 and 2 is fitted with a squirrel-cage rotor. However, it could equally as well have a double-cage rotor or a slip-ring motor. The annular throttle-type seal 18 can be formed between the tubular portion 10 of the annular dividing device 8 and a ring shrunk onto the rotor end-winding 16 or a bandage fitted to the rotor end-winding 16. If no stator pressure plate is necessary to hold the stator laminations together, the pressure plate can be replaced by a cover.

Figure 3:
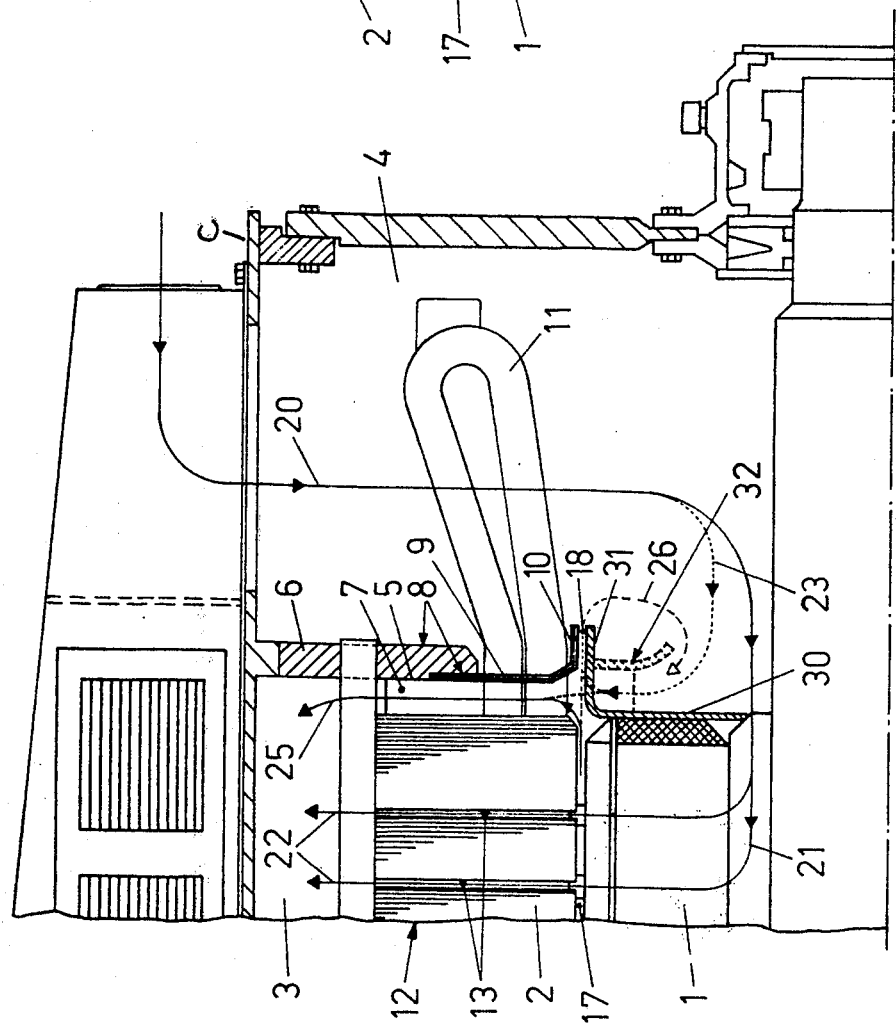
FIG. 3 shows a section through a version of a synchronous machine in accordance with the invention.

FIGS. 3 and 4 show a synchronous machine, the cooling arrangements for which are essentially the same as for the induction machine of FIGS. 1 and 2, corresponding components being identified by the same reference numbers. Here the rotor 1 is provided with a number of poles to accord with the desired speed. To the end face of the rotor 1 is fitted a radially extending cover plate 30 which includes an axially extending cylindrical flange 31. As in the case of the embodiment of the invention illustrated in FIGS. 1 and 2, the annular gas flow dividing member 8 includes pass-through openings for the end turn portion 11 of the stator winding and terminates radially inward of the end turn portion 11 in the vicinity of an axial projection of the air gap between the rotor and stator components. Thus, as in the embodiment of FIGS. 1 and 2, each of the annular gas flow dividing members 8 forms a substantially gas-tight partition between each channel 7 at a corresponding end of the stator and the corresponding gas flow inlet space 4, and the end turn portions 11 of the stator winding are essentially completely located within the gas flow inlet spaces 4 so that the cooling gas flows first in heat exchange contact with the end turn portions 11 of the stator winding before entering the interiors of the rotor and stator components. The cylindrical portion 10 of the annular dividing device 8 surrounds the cylindrical flange 31 and together with this forms the annular throttle-type seal 18. With this form of the synchronous machine, of course, the partial flow 23 indicated by the dotted line is equal to zero, as is evident from the drawing, since flange 31 functions as a barrier to entrance of gas into channel 7 directly from gas inlet space 4.

In place of the cover plate 30, a centrifugal fan 32, denoted by the broken line in the drawing, can be fitted to the end face of the rotor 1, the fan incorporating the cylindrical flange 31. In this case, also, the cylindrical portion 10 of the dividing device 8 would surround the cylindrical flange 31 and together with this form the annular throttle-type seal 18. The centrifugal fan 32 is basically unnecessary, but it has been included in the drawing to show that it could be fitted in order to increase the flow volume, without the need for significant alterations.

I claim:

1. A gas-cooled dynamo-electric machine comrising a casing enclosing a rotor component mounted for rotation and which is surrounded by a laminated stator component having a stator winding thereon, means providing a cooling gas flow inlet space within each end portion of said casing between the end wall thereof and the corresponding ends of the rotor and stator components and in which inlet spaces the end turns at opposite ends of said stator winding are located, means for introducing fresh cooling gas into said gas inlet end spaces for flow in a radially inward direction over said end turn portions of said stator winding, means providing a gas flow outlet space between the periphery of said stator component and the surrounding wall portion of said casing, said rotor and stator components being provided with radially extending slots for flow of cooling gas therethrough from each said gas inlet flow space following its passage over said end turn portions of said stator into said gas flow outlet space, and annular gas flow dividing members located respectively in axially spaced relation to the opposite end faces of said stator and which form substantially gas-tight partitions between the end faces of said stator and said gas flow inlet spaces, said annular gas flow dividing members together with the end faces of said stator thus forming radially extending stator end flow channels for flow of cooling gas from said gas inlet flow space radially outward therethrough into said gas flow outlet space thereby to effect cooling of said end faces of said stator and removal of heat generated in the end portions of said stator laminations, the axial width of said radially extending stator end flow channels being small in relation to the axial width of said gas flow inlet spaces thereby to effect a relatively higher gas flow velocity in said radially extending stator end flow channels than exists in said gas flow inlet spaces.

2. A gas-cooled dynamo-electric machine as defined in claim 1 wherein the axial width of each stator end flow channel is of the same order as the axial width of the radially extending cooling slots provided in said stator.

3. A gas-cooled dynamo-electric machine as defined in claim 1 wherein said annular flow dividing member comprises one radially extending functional surface opposite to the end face of the stator and forming one side wall of the channel, and an internal cylindrical functional surface surrounding a cylindrical part of the rotor and forming therewith an annular throttle type gas seal preventing flow of gas axially inward from said coolant-gas flow inlet space.

4. A gas-cooled dynamo-electric machine as defined in claim 1 wherein said machine is of the induction type and wherein the cooling gas pressure required for cooling the machine is provided exclusively by the rotor and an end winding thereon.

5. A gas-cooled dynamo-electric machine as defined in claim 1 wherein each of said annular gas flow dividing members comprises in part a plate member applied to the end face of said laminated stator member.

6. A gas-cooled dynamo-electric machine as defined in claim 1 wherein said machine is of the synchronous type, wherein each said annular flow dividing member comprises a first portion extending in a radially outward direction which functions to separate the stator end flow channel from the gas flow inlet space and a second axially extending cylindrical portion surrounding a cylindrical flange portion of a cover plate fastened to the end face of said rotor and which establishes therebetween an annular throttle-type gas seal preventing flow of gas axially inward from said gas flow inlet space through the seal.

7. A gas-cooled dynamo-electric machine as defined in claim 1 wherein the end face of said rotor is provided with a centrifugal fan including a shroud which incorporates a cylindrical flange that forms the rotor surface part of said annular throttle-type seal.

* * * * *